United States Patent
Matsui et al.

(10) Patent No.: US 8,568,868 B2
(45) Date of Patent: *Oct. 29, 2013

(54) GAS BARRIER FILM LAMINATE

(75) Inventors: Tsutomu Matsui, Fukuoka (JP); Shigenobu Yoshida, Tokyo (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,209

(22) Filed: Aug. 24, 2012

(65) Prior Publication Data

US 2012/0315462 A1    Dec. 13, 2012

Related U.S. Application Data

(63) Continuation of application No. 12/514,485, filed as application No. PCT/JP2007/072192 on Nov. 15, 2007, now Pat. No. 8,343,623.

(30) Foreign Application Priority Data

Nov. 16, 2006   (JP) ................................ 2006-309871

(51) Int. Cl.
| | |
|---|---|
| B32B 5/16 | (2006.01) |
| B32B 27/36 | (2006.01) |
| B32B 27/00 | (2006.01) |
| B32B 27/40 | (2006.01) |
| B32B 27/38 | (2006.01) |
| B32B 37/12 | (2006.01) |
| B32B 9/00 | (2006.01) |

(52) U.S. Cl.
USPC ........ 428/323; 428/480; 428/473.5; 428/704; 428/500; 428/698; 428/702; 428/446; 428/688; 428/413; 428/409; 428/412; 428/423.1

(58) Field of Classification Search
USPC ............. 428/323, 480, 473.5, 704, 500, 698, 428/702, 446, 688, 413, 409, 412, 423.1
See application file for complete search history.

(56) References Cited

U.S. PATENT DOCUMENTS

| | | | |
|---|---|---|---|
| 5,856,017 A | | 1/1999 | Matsuda et al. |
| 5,874,035 A | * | 2/1999 | Tsai et al. ................. 264/173.13 |
| 5,942,320 A | * | 8/1999 | Miyake et al. ................. 428/216 |
| 6,042,928 A | | 3/2000 | Suzuki et al. |
| 6,866,949 B2 | | 3/2005 | Ota et al. |
| 7,166,353 B2 | | 1/2007 | Yoshida et al. |
| 7,678,448 B2 | | 3/2010 | Hachisuka et al. |
| 7,910,213 B2 | | 3/2011 | Yoshida et al. |
| 8,343,623 B2 | * | 1/2013 | Matsui et al. ................. 428/323 |
| 2005/0123747 A1 | | 6/2005 | Yoshida et al. |
| 2006/0062995 A1 | * | 3/2006 | Yamamoto .................... 428/332 |
| 2007/0059518 A1 | | 3/2007 | Tanaka et al. |
| 2007/0059541 A1 | | 3/2007 | Yoshida et al. |
| 2007/0224402 A1 | | 9/2007 | Yoshida et al. |
| 2009/0274894 A1 | * | 11/2009 | Yoshida et al. ............ 428/319.1 |
| 2011/0086220 A1 | | 4/2011 | Yoshida et al. |

FOREIGN PATENT DOCUMENTS

| | | |
|---|---|---|
| JP | 08-281881 | 10/1996 |
| JP | 10-323928 A | 12/1998 |
| JP | 2000-015655 A | 1/2000 |
| JP | 2001-026069 A | 1/2001 |
| JP | 2002-211631 A | 7/2002 |
| JP | 2002-355915 A | 12/2002 |
| JP | 2003-249349 A | 9/2003 |
| JP | 2003-260750 A | 9/2003 |
| JP | 2003-342735 A | 12/2003 |
| JP | 2004-136466 A | 5/2004 |
| JP | 2004230567 A | 8/2004 |
| JP | 2005-111983 A | 4/2005 |
| JP | 2006-051751 A | 2/2006 |
| WO | WO 2005037534 A | 4/2005 |
| WO | WO2007119825 A1 * | 10/2007 |

OTHER PUBLICATIONS

Japanese Office Action dated Jun. 25, 2013 in corresponding Japanese Patent Application No. 2012-024169, 3 pp.

* cited by examiner

*Primary Examiner* — Lorna M Douyon
(74) *Attorney, Agent, or Firm* — Oblon, Spivak, McClelland, Maier & Neustadt, L.L.P.

(57) ABSTRACT

Disclosed is a gas-barrier film laminate having at least two gas-barrier film layers laminated via an adhesive layer, wherein the gas-barrier film layer has a substrate film, and at least one constitutive unit layer comprising an anchor coat layer and an inorganic thin film layer formed on at least one surface of the substrate film in that order, and wherein the number of the bubbles having a diameter of at least 0.5 mm and the impurities having a diameter of at least 0.5 mm existing between the gas-barrier film layers is at most 3 in total per 100 $cm^2$.

15 Claims, No Drawings

GAS BARRIER FILM LAMINATE

CROSS-REFERENCE TO PRIOR APPLICATION

This is a continuation of U.S. Ser. No. 12/514,485, filed on Jun. 1, 2009, now U.S. Pat. No. 8,343,623, which is the U.S. National Phase Application under 35 U.S.C. §371 of International Patent Application No. PCT/JP2007/072192 filed Nov. 15, 2007, which claims the benefit of Japanese Patent Application No. 2006-309871 filed Nov. 16, 2006, both of them are incorporated by reference herein. The International Application was published in Japanese on May 22, 2008 as WO2008/059925 A1 under PCT Article 21(2).

TECHNICAL FIELD

The present invention relates to a film laminate excellent in gas-barrier property, appearance and interlayer adhesiveness.

BACKGROUND ART

As a gas-barrier film laminate comprising a gas-barrier film for use for packaging materials, for example, heretofore known are one produced by laminating layers of transparent resin layer/oxide thin film layer/moisture-absorbing resin layer via an adhesive layer for the purpose of enhancing the water vapor-barrier property thereof (see Patent Document 1); one produced by laminating at least two resin layers and laminating an organic/inorganic hybrid layer formed according to a sol-gel process between the layers for the purpose of enhancing the heat resistance and the gas-barrier property thereof (see Patent Document 2), etc.

In case where gas-barrier films are laminated via an adhesive layer in the manner as above and when the adhesive layer is cured by heating, then various gases such as carbon dioxide are formed during curing reaction or owing to the later influence of moisture in the substrate or in air, whereby the laminate structure may be whitened owing to bubbling or foaming to occur between the laminated gas-barrier films, therefore causing a problem in point of the appearance thereof. When the bubbling or foaming is too much, then it may cause the reduction in the gas-barrier property and the reduction in the lamination strength.

In particular, in case where an isocyanate-based adhesive is used, a reaction gas such as carbon dioxide may be often generated with the curing reaction during curing, and in case where gas-barrier films are multi-laminated, there occurs a problem in that a large quantity of bubbles are generated.

In addition, in case where gas-barrier films are multi-laminated, there occurs another problem in that air remaining in the interface between the adhesive and the gas-barrier film may form bubbles to worsen the appearance of the laminate.

Regarding the problem, in Patent Document 3, the adhesive composition is specifically noted, and a film that has solved the problem of foaming whitening and bubbling contamination by removing the influence of moisture thereon is disclosed.

The film could improve the intended property mentioned above in some degree, but is still insufficient in point of the gas-barrier property and the lamination strength (interlayer adhesiveness) of the laminate, and it is desired to improve this.

[Patent Document 1] JP-A 2003-249349
[Patent Document 2] JP-A 2004-136466
[Patent Document 3] JP-A 2006-51751

DISCLOSURE OF THE INVENTION

Problems that the Invention is to Solve

The present invention relates to a gas-barrier film laminate in which the generation of bubbles and impurities between the gas-barrier films is noticeably reduced and which is excellent in the gas-barrier property and the interlayer adhesiveness.

Means for Solving the Problems

Specifically, the present invention relates to:

(1) a gas-barrier film laminate having at least two gas-barrier film layers laminated via an adhesive layer, wherein the gas-barrier film layer has a substrate film, and at least one constitutive unit layer comprising an anchor coat layer and an inorganic thin film layer formed on at least one surface of the substrate film in that order, and wherein the number of the bubbles having a diameter of at least 0.5 mm and the impurities having a diameter of at least 0.5 mm existing between the gas-barrier film layers is at most 3 in total per 100 $cm^2$;

(2) a method for producing a gas-barrier film laminate comprising:
(a) a step of forming, on a substrate, at least one constitutive unit layer comprising an anchor coat layer and an inorganic thin film layer in that order, thereby forming a gas-barrier film layer,
(b) a step of laminating at least two formed gas-barrier film layers via an adhesive layer, and
(c) after or simultaneously with the lamination of gas-barrier film layers, a step of heating it or irradiating it with energy rays in a vacuum atmosphere at not more than 1000 Pa; and (3) a method for producing a gas-barrier film laminate comprising:
(a) a step of forming, on a substrate, at least one constitutive unit layer comprising an anchor coat layer and an inorganic thin film layer in that order, thereby forming a gas-barrier film layer, and
(b) a step of laminating at least two formed gas-barrier film layers via an adhesive layer comprising an epoxy-based resin.

Effect of the Invention

According to the present invention, there is provided a gas-barrier film laminate in which the generation of bubbles and impurities between the gas-barrier films is noticeably reduced and which is excellent in the gas-barrier property and the interlayer adhesiveness.

Best Mode for Carrying out the Invention

The present invention is described in detail hereunder.
[Gas-Barrier Film Laminate]
The gas-barrier film laminate of the present invention has at least two gas-barrier film layers laminated via an adhesive layer, wherein the gas-barrier film layer has a substrate film, and at least one constitutive unit layer comprising an anchor coat layer and an inorganic thin film layer formed on at least one surface of the substrate film in that order, and wherein the number of the bubbles having a diameter of at least 0.5 mm and the impurities having a diameter of at least 0.5 mm existing between the gas-barrier film layers is at most 3 in total per 100 $cm^2$.

The gas-barrier film laminate of the present invention comprises at least two gas-barrier films laminated via an adhesive layer.

For imparting the adhesive layer, employable is any of a method of applying an adhesive onto the surface of the gas-barrier film layer, or a method of laminating an adhesive film between the gas-barrier films.

As the adhesive for the adhesive layer, usable are thermosetting adhesives, energy ray-curable adhesives, etc.

The thermosetting adhesive includes, for example, polyester-based resin, urethane-based resin, acrylic resin, ether-based resin, phenolic resin, furan-based resin, urea-based resin, melamine-based resin, epoxy-based resin, etc. The energy ray-curable adhesive includes, for example, urethane-based resin, polyester-based resin, etc. Of those, preferred is at least one selected from urethane-based resin, epoxy-based resin, polyester-based resin, and acrylic resin. Further from the viewpoint of reducing the generation of bubbles, more preferred are epoxy-based resin and acrylic resin; and even more preferred is epoxy-based resin.

One concrete example of the adhesive composition comprises, for example, an urethane (meth) acrylate ingredient, an epoxy (meth) acrylate ingredient, an alicyclic (meth) acrylate ingredient, and an optional polymerization initiator.

The adhesive is not limited to a thermosetting resin, but may also be a thermoplastic resin such as polyimide, polyether imide, polyether amide-imide, etc.

The adhesive resin may be used singly, or two or more different types of those resins may be combined and used.

Preferably, the adhesive layer has a moisture permeability at 40° C. and 90% RH of at most 1000 g/m$^2$/24 hr through the thickness thereof of 1 μm, from the viewpoint of enhancing the gas-barrier property of the inorganic thin films. More preferably, the moisture permeability is at most 300 g/m$^2$/24 hr.

Also preferably, the oxygen permeability through the adhesive layer at 25° C. and 90% RH is at most 1000 ml/m$^2$/24 hr/MPa, from the viewpoint of enhancing the gas-barrier property of the inorganic thin films, more preferably at most 500 ml/m$^2$/24 hr/MPa, even more preferably at most 100 ml/m$^2$/24 hr/MPa. From the above-mentioned viewpoint, preferably in the present invention, the water vapor permeability (moisture permeability) through the gas-barrier film is at most 0.2 g/m$^2$/24 hr at 40° C. and 90% RH and the oxygen permeability through the adhesive layer falls within the above range.

Further, in the adhesive layer, preferably used is an adhesive having a large number of aromatic rings such as metaxylenediamine skeletons, paraxylenediamine skeletons and bisphenol skeletons and capable of making the adhesive layer have a gas-barrier property. Further, for preventing the generation of bubbles therein after the formation of the gas-barrier film laminate, an epoxy-based resin is preferably used as the adhesive.

Examples of the epoxy-based resin having the advantage of gas-barrier property and prevention of bubble formation include epoxy resin having a glycidylamine moiety derived from metaxylylenediamine, epoxy resin having a glycidylamine moiety derived from 1,3-bis(aminomethyl)cyclohexane, epoxy resin having a glycidylamine moiety derived from diaminodiphenylmethane, epoxy resin having a glycidylamine moiety derived from paraaminophenol, epoxy resin having a glycidyl ether moiety derived from bisphenol A, epoxy resin having a glycidyl ether moiety derived from bisphenol F, epoxy resin having a glycidyl ether moiety derived from phenol novolak, epoxy resin having a glycidyl ether moiety derived from resorcinol, etc. Above all, more preferred are epoxy resin having a glycidylamine moiety derived from metaxylylenediamine and/or epoxy resin having a glycidyl ether moiety derived from bisphenol F from the viewpoint of the gas-barrier property thereof.

Preferably, the epoxy resin is in the adhesive layer in an amount of at least 50% by mass, from the viewpoint of the effect of the present invention, more preferably at least 60% by mass, even more preferably at least 80% by mass, still more preferably at least 100% by mass.

The curing agent for the epoxy resin is preferably a reaction product of the following (A) and (B) or a reaction product of the following (A) and (C) or a reaction product of the following (A), (B) and (C) from the viewpoint of the effect of the present invention; these may be used singly and two or more of these may be used as combined.

(A) Metaxylenediamine or paraxylenediamine;
(B) Polyfunctional compound having at least one acyl group capable of forming an amide group moiety through reaction with a polyamine to form an oligomer;
(C) Monovalent carboxylic acid having from 1 to 8 carbon atoms and/or its derivative.

Concretely mentioned are metaxylylenediamine or paraxylylenediamine, and modified reaction products with epoxy resins or monoglycidyl compounds using them as a starting material, modified reaction products thereof with alkylene oxides having from 2 to 4 carbon atoms, addition reaction products thereof with epichlorohydrin, reaction products thereof with polyfunctional compounds having at least one acyl group capable of forming an amide group moiety through reaction with these polyamines to form oligomers, and reaction products of polyfunctional compounds having at least one acyl group capable of forming an amide group moiety through reaction with these polyamines to form oligomers, with monovalent carboxylic acids having from 1 to 8 carbon atoms and/or derivatives thereof, etc.

Also usable is a water-base adhesive comprising, as the main ingredient thereof, an anionic water-base polyurethane emulsion having, as the main skeleton thereof, a polyolefin-based polyol prepared through reaction of a polyolefin-based polymer and a polyisocyanate, and containing, as other ingredients, amines and water-soluble high-boiling-point organic solvents, etc. The water-base adhesive is effective for adhesion of polyolefin-based resin materials and polyester-based resin materials. The water-base adhesive may contain, if desired, one or more water-base plastic emulsions selected from polyether-based polyurethane emulsion, polyester-based polyurethane emulsion, polycarbonate-based polyurethane emulsion, polyacrylate ester emulsion, ethylene/vinyl acetate copolymer emulsion, styrene/butadiene copolymer emulsion, polyvinyl acetate emulsion, etc.

The viscosity of the adhesive layer may be controlled by controlling the resin amount in the adhesive composition and, in addition to it, also by controlling the temperature and the time in coating with the adhesive varnish to thereby control the remaining solvent amount, and in case of a thermosetting resin, further controlling the semi-cured condition thereof.

Adding inorganic particles or organic particles to the adhesive layer may be effective for finely dispersing the gas taken in the resin for the adhesive layer in mixing it or generated therein during reaction to thereby disperse the bubbles in the adhesive layer into those having a size of at most 0.01 μm, whereby a gas-barrier laminate having a good appearance can be produced.

Concretely, inorganic particles of crystalline silica, amorphous silica, aluminium hydroxide, alumina, aluminium nitride, boron nitride, antimony trioxide or the like, or organic particles of silicone powder or the like may be added to the adhesive layer in preparing it. One or more different types of the inorganic particles and the organic particles may be used either singly or as combined. As the inorganic particles, preferred are silica particles from the viewpoint of the availability and the stability.

From the viewpoint of the hot water resistance and the cohesive failure resistance thereof, the mean particle size of the inorganic particles or the organic particles is preferably from 0.005 to 50 μm, more preferably from 0.01 to 20 μm, even more preferably from 0.05 to 10 μm. The content of the inorganic particles and/or the organic particles in the adhesive is preferably from 0.01 to 30% by mass, more preferably from 0.05 to 10% by mass, from the viewpoint of the defoamability and the adhesion strength of the layer.

In addition to the above, if desired, any other additives may be further added to the adhesive, such as curing promoter, coupling agent, inorganic ion adsorbent, polymerization initiator, tackifier, wetting agent, etc.

The thickness of the adhesive layer comprising adhesive is preferably from 0.2 to 30 μm, more preferably from 0.5 to 10 μm from the viewpoint of the adhesion strength and the workability thereof.

In case where an adhesive film is used and when an adhesive film is used alone, its thickness is preferably from 1 to 100 μm, more preferably from 5 to 50 μm from the viewpoint of the workability thereof. In case where a base film is used, its thickness is preferably at least 3 μm, more preferably from 5 to 100 μm from the viewpoint of the barrier property thereof; and the overall thickness of the base film along with the adhesive layer formed on both surfaces thereof is preferably from 6 to 160 μm, more preferably from 10 to 100 μm or so. In this case, the thickness of the adhesive layer on both surfaces of the base film may be the same or different.

The adhesive film preferably has a low modulus of elasticity for reducing the thermal stress to result from the thermal expansion coefficient difference between the film and the gas-barrier film. Preferably, the storage modulus, as measured with a dynamic viscoelasticity measuring device, of the film is from 10 to 2000 MPa at 25° C. and is from 3 to 50 MPa at 260° C.

Concretely, for example, the adhesive film comprises at least one selected from epoxy-based resin, acrylic resin, epoxy group-containing acrylic copolymer, phenolic resin, epoxy resin curing agent, and semi-cured epoxy-based thermosetting resin comprising epoxy resin curing agent.

In the present invention, preferably, the surface roughness Rms of the adhesive layer or the adhesive film is from 0.05 to 40 μm, for the purpose of bettering the defoamability of removing the bubbles to form between the film in curing, more preferably from 0.10 to 20 μm, even more preferably from 0.2 to 20 μm. The level of the surface roughness Rms maybe attained, for example, according to a method of adding inorganic particles or organic particles, or mixing two or more different types of resins, or mechanically roughening the surface; and this may be determined according to the method to be mentioned hereunder.

In the present invention, the gas-barrier film laminate maybe produced by laminating at least two, preferably at least three gas-barrier laminate layers; and from the viewpoint of the workability thereof, preferably, the above-mentioned adhesive layer (adhesive or adhesive film) is provided on the surface of the inorganic thin film or the protective layer constituting the gas-barrier film layer to be laminated, and more preferably, the adhesive layer is stuck to the substrate surface of the gas-barrier film layer to be laminated.

The gas-barrier film laminate of the present invention does not contain at all bubbles and/or impurities having a diameter of the largest part thereof of at least 0.5 mm, or contains them in an amount by number of at most 3 per 100 cm². The diameter of the bubbles or the impurities may be measured according to a method of using a stereomicroscope. Impurities as referred to herein mean, for example, resin powder, metal powder, etc. In case where the impurities take bubbles therein, then the size of the bubble is measured as the diameter thereof.

In the present invention, the number or such bubbles and impurities is at most 3 per 100 cm² of the gas-barrier film laminate; but from the viewpoint of the appearance and the optical properties thereof, the number is preferably at most 2, more preferably at most 1, even more preferably at most 0.1. In particular, in the present invention, in case where the laminate comprises at least three layers, the number of the bubbles and the impurities is preferably at most 2 per 100 cm² of the gas-barrier film laminate.

In the present invention, "between the gas-barrier films" where the above-mentioned bubbles or impurities may exist is meant to indicate the total number of the bubbles and the impurities existing in the plural interlayers to be formed by the plural gas-barrier film layers.

In the present invention, for controlling the bubbles and/or the impurities to fall within the above-mentioned range, various methods may be employable with no specific limitation. Preferred are any of (a) a method of using an epoxy-based resin or an acrylic resin as the adhesive layer; (b) a method of heating the gas-barrier film layers or irradiating them with energy rays in a vacuum atmosphere at not more than 1000 Pa, after or during laminating the gas-barrier film layers; (c) a method of heating the layers under a pressure not lower than atmospheric pressure after temporarily pressing them in a vacuum atmosphere; (d) a method of adding organic fine particles or inorganic fine particles to the adhesive layer; (e) in addition to the above methods, a method of controlling the surface roughness (Rms) of the adhesive layer to a specific level, etc.

The methods (a), (d) and (e) are as mentioned in the above. In the method (b) of lamination in a vacuum atmosphere, preferably, the heating or the irradiation with energy rays is attained in a vacuum atmosphere at not more than 200 Pa for preventing the formation of bubbles between the gas-barrier films, more preferably at not more than 20 Pa, even more preferably at not more than 10 Pa.

In the methods (a) and (b), the heating is attained preferably at a temperature of from 30 to 250° C., more preferably from 50 to 200° C., even more preferably from 80 to 180° C., from the viewpoint of preventing the formation of bubbles between the gas-barrier film layers. Preferably, the heating is attained under pressure, from the viewpoint of the adhesiveness of the layers. The pressure is preferably from 1 to 50 kgf/cm² in terms of the surface pressure; more preferably, the surface pressure is from 5 to 25 kgf/cm², even more preferably from 10 to 20 kgf/cm². The method for heating and pressure application is not specifically defined. For example, the composition is put into a mold not closed, and the metal plate in the mold is heated externally to thereby indirectly heat the composition. As the indirect heating method, for example, a heater is fitted to the outer surface of the metal plate to heat the composition, or a heating medium flow line is provided in the metal plate and the composition is heated with steam, hot oil or the like according to a jacket system. The mold is pressed under a predetermined pressure and then cooled to obtain a gas-barrier film laminate.

In the above-mentioned method (c) of temporary pressing in a vacuum atmosphere, preferably, the layers are pressed under the pressure in the vacuum condition of the above (a).

The energy rays include active energy rays such as visible light, UV rays, electron rays, radioactive rays, etc. Of those, preferred are UV rays and electron rays from the viewpoint of more efficiently preventing the formation of bubbles between the gas-barrier film layers. In case where UV rays are radiated as active energy rays, various light emitting sources are usable with no specific limitation, such as typically UV lamps, e.g., low-pressure mercury lamp, high-pressure mercury lamp, xenon lamp, etc.; and the irradiation may be controlled in accordance with the film thickness and the curing condition. The radiation energy of UV rays is preferably from 100 to 5000 mJ/cm$^2$, more preferably from 1000 to 3000 mJ/cm$^2$. When the radiation energy is within the above range, resin layers may be sufficiently cured and it is favorable from the viewpoint of producibility.

The method of irradiation with electron rays as active energy rays for curing is preferred, as not requiring a photoinitiator. The absorption dose of electron rays is preferably within a range of from 1 to 200 kGy within which resin layers can be fully cured, more preferably within a range of from 5 to 100 kGy within which the curing is more satisfactory causing little damage to plastic films and resin layers. When the absorption dose is within the above range, then resin layers may be cured sufficiently with no damage to plastic films and resin layers, not detracting from the gas-barrier property thereof.

In case where electron rays are radiated as active energy rays, any known apparatus can be used. In consideration of the damage caused by electron rays to plastic films and resin layers, preferred is irradiation with electron rays having an acceleration voltage of from 1 kV to 200 kV. When the acceleration voltage of the electron rays falls within the above range, then the curing depth is satisfactory and the mechanical properties of the obtained substrates for gas-barrier film laminates are not worsened. Forming resin layers through irradiation with electron rays having a low acceleration voltage of at most 100 kV, especially at most 50 kV is favorable, as not lowering the mechanical strength of the substrates for gas-barrier film laminates.

The gas-barrier film layer to form the gas-barrier film laminate of the present invention comprises a substrate film and at least one constitutive unit layer formed on the substrate film.

The substrate film is preferably a plastic film having a shrinkage at 150° C. of from 0.01 to 5%, from the viewpoint of the barrier property thereof, more preferably a plastic film having a shrinkage of 0.01 to 2%. The shrinkage may be determined from the dimensional change before and after heating in a hot air oven.

Not specifically defined, the material for the substrate film may be any and every resin usable for ordinary packaging materials. Concretely, it includes various resins, for example, amorphous polyolefins, e.g., polyolefins such as homopolymers or copolymers of ethylene, propylene, butene, etc., or cyclic polyolefins; polyesters such as polyethylene terephthalate, polyethylene-2,6-naphthalate, etc.; polyamides such as nylon 6, nylon 66, nylon 12, copolymer nylon, etc.; polyvinyl alcohol, partially-hydrolyzed ethylene/vinyl acetate copolymer (EVOH), polyimide, polyetherimide, polysulfone, polyether sulfone, polyether ether ketone, polycarbonate, polymethacrylate, polyvinyl butyral, polyarylate, fluororesins, acrylate resins, biodegradable resins, etc. Of those, preferred are polyester resins, polycarbonate-based resins, polymethacrylic resins, polyetherimide-based resins, polyether sulfone and cyclic olefin-based resins, from the viewpoint of the film strength and the cost. The substrate film may contain known additives, for example, antistatic agent, light-shielding agent, UV absorbent, plasticizer, lubricant, filler, colorant, stabilizer, release agent, crosslinking agent, antiblocking agent, antioxidant, etc.

The plastic film for the substrate film is formed by shaping the above-mentioned material; and for use as a substrate, the film may be unstretched or stretched. It may be laminated with any other plastic substrate. The substrate film may be produced in any known method. For example, the starting resin is melted in an extruder, extruded out through a ring die or a T-die, and then rapidly cooled to produce a substantially amorphous, non-oriented unstretched film. The unstretched film may be stretched in the film flow (longitudinal) direction or in the direction perpendicular (transversal) to the film flow direction, according to a known method of monoaxial stretching, tenter-assisted successive biaxial stretching, tenter-assisted simultaneous biaxial stretching, tubular simultaneous biaxial stretching or the like, thereby producing a film stretched in at least monoaxial direction. The thickness of the substrate is selected generally within a range of from 5 to 500 µm in accordance with the use thereof and from the viewpoint of the mechanical strength, the flexibility and the transparency of the substrate for the gas-barrier film laminate of the present invention, preferably within a range of from 10 to 200 µm. The substrate film includes thick sheets. Not specifically defined, the width and the length of the film may be selected in any desired manner in accordance with the use thereof.

The constitutive unit layer to constitute the gas-barrier film layer comprises an anchor coat layer and an inorganic thin film. The anchor coat layer to constitute the constitutive unit layer may be a layer of at least any one selected from a resin such as a thermosetting resin or a thermoplastic resin, as well as a metal, a metal oxide and a metal nitride.

The resin such as thermosetting resin or thermoplastic resin to form the anchor coat layer may be any solvent-base or water-base resin. Concretely, one or more of polyester-based resin, urethane-based resin, acrylic resin, nitrocellulose-based resin, silicone-based resin, alcoholic hydroxyl group-containing resin (vinyl alcohol-based resin, ethylene/vinyl alcohol-based resin, etc.), vinyl-based modified resin, isocyanate group-containing resin, carbodiimide-based resin, alkoxyl group-containing resin, epoxy-based resin, oxazolin group-containing resin, modified styrene-based resin, modified silicone-based resin, alkyl titanate and the like may be used either singly or as combined.

In the present invention, at least one resin selected from a group consisting of polyester-based resin, urethane-based resin, acrylic resin, isocyanate group-containing resin, oxazoline group-containing resin, carbodiimide-based resin, alcoholic hydroxyl group-containing resin and copolymer of at least two resins of these is preferably used from the viewpoint of the gas-barrier property thereof. Above all, preferred is polyester-based resin.

The polyester-based resin for use for the anchor coat layer may be prepared by reacting a polycarboxylic acid ingredient and polyalcohol ingredient. The polycarboxylic acid ingredient includes terephthalic acid, isophthalic acid, adipic acid, sebacic acid, azelaic acid, orthophthalic acid, diphenylcarboxylic acid, dimethylphthalic acid, etc.; and the polyalcohol ingredient includes ethylene glycol, 1,2-propylene glycol, 1,3-propylene glycol, 1,4-butanediol, diethylene glycol, neopentyl glycol, dipropylene glycol, 1,6-hexanediol, bisphenol A, etc.

The molecular weight of the resin to constitute the anchor coat layer may be from 3,000 to 30,000 in terms of the number-average molecular weight thereof, from the viewpoint of the gas-barrier property and the adhesiveness of the layer, preferably from 4,000 to 28,000, more preferably from 5,000 to 25,000.

From the viewpoint of enhancing the interlayer adhesiveness, a silane-coupling agent is preferably added to the anchor coat layer. The silane-coupling agent includes, for example, an epoxy group-containing silane coupling agent such as β-(3,4-epoxycyclohexyl)ethyltrimethoxysilane, γ-glycidoxypropylmethyldiethoxysilane, γ-glycidoxypropyltrimethoxysilane; an amino group-containing silane-coupling agent such as γ-aminopropyltrimethoxysilane, N-β-(aminoethyl)-γ-aminopropylmethyldiethoxysilane, N-β-(aminoethyl)-γ-aminopropyltrimethoxysilane, N-β-(aminoethyl)-γ-aminopropyltriethoxysilane; and their mixtures. From the viewpoint of the interlayer adhesiveness, γ-glycidoxypropyltrimethoxysilane and γ-aminopropyltrimethoxysilane are preferred as the silane-coupling agent. One or more such silane-coupling agents may be used either singly or as combined. From the viewpoint of the adhesiveness of the layer, the silane-coupling agent is added to the anchor coat layer preferably in an amount of from 0.1 to 80% by mass relative to the resin that forms the layer, more preferably from 1 to 50% by mass.

Preferably, a curing agent is added to the anchor coat layer. As the curing agent, preferred is polyisocyanate. Concretely, for example, it includes aliphatic polyisocyanates such as hexamethylene diisocyanate, dicyclohexylmethane diisocyanate; and aromatic polyisocyanates such as xylene diisocyanate, tolylene diisocyanate, diphenylmethane diisocyanate, polymethylene polyphenylene diisocyanate, tolylene diisocyanate, naphthalene diisocyanate, etc. Especially preferred are bifunctional or more polyfunctional polyisocyanates from the viewpoint of enhancing the gas-barrier property of the layer.

If desired, various known additives may be added to the anchor coat layer. The additives include polyalcohols such as glycerin, ethylene glycol, polyethylene glycol, polypropylene glycol; water-base epoxy resin; lower alcohols such as methanol, ethanol, normal propanol, isopropanol; ethers such as ethylene glycol monomethyl ether, propylene glycol monomethyl ether, propylene glycol diethyl ether, diethylene glycol monoethyl ether, propylene glycol monoethyl ether; esters such as propylene glycol monoacetate, ethylene glycol monoacetate; antioxidant, weather-resistant stabilizer, UV absorbent, antistatic agent, pigment, dye, microbicide, lubricant, inorganic filler, antiblocking agent, adhesive, etc.

As the metal to form the anchor coat layer, preferred are chromium, aluminium, silicon, nickel, titanium, tin, iron, molybdenum and alloys of two or more of these, from the viewpoint of the gas-barrier property and the adhesiveness of the layer. As the metal oxide and the metal nitride, preferred are oxides and nitrides of the above-mentioned metal from the viewpoint of the gas-barrier property and the adhesiveness. In the present invention, as the anchor coat layer, preferred is at least one selected from chromium, silicon oxide, aluminium oxide, titanium oxide, silicon nitride, aluminium nitride and titanium nitride, from the above-mentioned viewpoint; and more preferred is at least one selected from silicon oxide and silicon nitride. Also preferred for use as the anchor coat layer is a substance consisting essentially of a hydrocarbon such as diamond-like carbon.

In the gas-barrier film laminate of the present invention, the thickness of the anchor coat layer may be from 0.1 to 5,000 nm, but preferably from 0.1 to 2,000 nm, more preferably from 0.1 to 1,000 nm from the viewpoint of the adhesiveness of the layer. For enhancing the waterproofness and the durability thereof, the anchor coat layer may be crosslinked through irradiation with energy rays.

For forming the anchor coat layer, employable is any known coating method. For example, employable is any coating method with a reverse roll coater, a gravure coater, a rod coater, an air doctor coater, a spray or a brush. As the case may be, the substrate film and the vapor-deposited film may be dipped in a resin liquid for the formation. After coated, the solvent may be evaporated away in any known drying method of heating such as hot air drying or hot roll drying at a temperature of from 80 to 200° C. or so, or IR drying. As a result, a laminate film having a uniform coating layer may be produced.

For forming the anchor coat layer comprising at least one selected from a metal, a metal oxide and a metal nitride, employable is any method of, for example, a vapor deposition method such as PVD (physical vapor deposition), e.g., vacuum evaporation deposition, ion plating or sputtering, or CVD (chemical vapor deposition), or a coating method. From the viewpoint of forming a uniform thin film having good adhesiveness, a vapor deposition method is preferred. For the vapor deposition method, usable is the same method as that for use in forming an inorganic thin film to be mentioned hereunder.

For enhancing the coatability and adhesiveness of the anchor coat agent to the substrate film, the substrate film may be processed for ordinary surface treatment such as chemical treatment or discharge treatment before the anchor coat agent is applied to the substrate film.

In the constitutive unit layer to constitute the gas-barrier film layer, an inorganic thin film is formed on the anchor coat layer. The inorganic substance to constitute the inorganic thin film includes silicon, aluminium, magnesium, zinc, tin, nickel, titanium, hydrocarbons, etc., and also their oxides, carbides, nitrides and their mixtures. Preferred are silicon oxide, silicon nitride, aluminium oxide, aluminium nitride, and substances consisting essentially of hydrocarbon such as diamond-like carbon. More preferred are silicon oxide and aluminium oxide, as capable of stably maintaining a high-level gas-barrier property. One or more of the above-mentioned inorganic substances may be used either singly or as combined.

For forming the inorganic thin film, employable is any method of a vapor deposition method or a coating method; but preferred is a vapor deposition method as capable of forming a uniform thin film having a high-level gas-barrier property. The vapor deposition method includes any methods of PVD (physical vapor deposition) such as vacuum vapor deposition, ion plating or sputtering, and CVD (chemical vapor deposition).

The thickness of the inorganic thin film may be generally from 0.1 to 500 nm, but preferably from 0.5 to 40 nm. Within the above range, the inorganic thin film may have a sufficient gas-barrier property and is excellent in transparency with no trouble of cracking or delamination of the inorganic thin film.

In the present invention, the gas-barrier film layer includes one having an inorganic thin film between the substrate film and the constitutive unit layer. The inorganic thin film may be the same as that constituting the constitutive unit layer mentioned in the above.

The gas-barrier film layer may have a protective layer as the outermost layer thereof. The resin to form the protective layer may be any of a solvent-base or water-base resin. Concretely, one or more of polyester-based resin, urethane-based resin, acrylic resin, polyvinyl alcohol-based resin, ethylene/unsaturated carboxylic acid copolymer, ethylene/vinyl alcohol-based resin, vinyl-modified resin, nitrocellulose-based resin, silicone-based resin, isocyanate-based resin, epoxy-based resin, oxazoline group-containing resin, modified styrene-based resin, modified silicone-based resin, alkyl titanate and the like may be used either singly or as combined. As the protective layer, usable is a layer formed of a mixture prepared by mixing at least one type of inorganic particles selected from silica sol, alumina sol, particulate inorganic filler and layered inorganic filler, with at least one resin as above for enhancing the barrier property, the abrasion resistance and the lubricity of the layer, or a layer comprising an inorganic particles-containing resin formed through polymerization of the above-mentioned resin material in the presence of the inorganic particles.

As the resin to form the protective layer, preferred is the above-mentioned water-base resin from the viewpoint of enhancing the gas-barrier property of the inorganic thin film. As the water-base resin, more preferred is vinyl alcohol resin or ethylene/vinyl alcohol resin. As the protective layer, usable is a resin layer formed by coating with a water-base liquid that contains polyvinyl alcohol and ethylene/unsaturated carboxylic acid copolymer.

The thickness of the protective layer is preferably from 0.05 to 10 μm, more preferably from 0.1 to 3 μm from the viewpoint of the printability and the workability thereof. For forming the layer, employable is any known coating method. For example, employable is any coating method with a reverse roll coater, a gravure coater, a rod coater, an air doctor coater, a spray or a brush. As the case may be, the vapor-deposited film may be dipped in a resin liquid for protective layer. After coated, water may be evaporated away in any known drying method of heating such as hot air drying or hot roll drying at a temperature of from 80 to 200° C. or so, or IR drying. As a result, a film having a uniform coating layer may be produced.

In the present invention, the number of the constitutive unit layer to form the gas-barrier film layer is at least one, but from the viewpoint of the gas-barrier property thereof, the number of the layers is preferably from 1 to 10, more preferably from 1 to 5. In case where the gas-barrier film layer has the plural constitutive unit layers, then the constitutive unit layers may be the same or different. Regarding the number of the constitutive unit layers as referred to herein, one constitutive unit that comprises an anchor coat layer and an inorganic thin film is one layer of the constitutive unit layer.

Preferred embodiments of the gas-barrier film layer to constitute the gas-barrier film laminate are mentioned below.
(1) Substrate film/AC/inorganic thin film,
(2) Substrate film/AC/inorganic thin film/AC/inorganic thin film,
(3) Substrate film/AC/inorganic thin film/AC/inorganic thin film/Ac/inorganic thin film,
(4) Substrate film/AC/inorganic thin film/AC/inorganic thin film/AC/inorganic thin film/AC/inorganic thin film,
(5) Substrate film/AC/inorganic thin film/protective layer,
(6) Substrate film/AC/inorganic thin film/AC/inorganic thin film/protective layer,
(7) Substrate film/AC/inorganic thin film/AC/inorganic thin film/AC/inorganic thin film/protective layer,
(8) Substrate film/AC/inorganic thin film/AC/inorganic thin film/AC/inorganic thin film/AC/inorganic thin film/protective layer,
(9) Substrate film/inorganic thin film/AC/inorganic thin film,
(10) Substrate film/inorganic thin film/AC/inorganic thin film/AC/inorganic thin film,
(11) Substrate film/inorganic thin film/AC/inorganic thin film/AC/inorganic thin film/AC/inorganic thin film,
(12) Substrate film/inorganic thin film/AC/inorganic thin film/protective layer,
(13) Substrate film/inorganic thin film/AC/inorganic thin film/AC/inorganic thin film/protective layer,
(14) Substrate film/inorganic thin film/AC/inorganic thin film/AC/inorganic thin film/AC/inorganic thin film/protective layer.

(Ac Means an Anchor Coat Layer.)

The water vapor permeability (moisture permeability) through the gas-barrier film layer at 40° C. and 90% RH is preferably at most 0.2 g/m$^2$/24 hr from the viewpoint of the barrier property as a result of lamination, more preferably at most 0.1 g/m$^2$/24 hr, even more preferably at most 0.05 g/m$^2$/24 hr.

The gas-barrier film laminate of the present invention has at least two gas-barrier film layers each comprising at a substrate film and at least one constitutive unit layer, preferably having from 2 to 100, more preferably from 3 to 20, even more preferably from 3 to 10 of such gas-barrier film layers from the viewpoint of the gas-barrier property and the producibility thereof. The plural gas-barrier film layers may be the same or different. Regarding the number of the gas-barrier film layers as referred to herein, one gas-barrier film layer that comprises a substrate film and at least one constitutive unit layer is one layer of the gas-barrier film layer.

In the present invention, usable are various gas-barrier film laminates optionally laminated with any other additional constitutive layers in accordance with the use thereof. In practical embodiments, gas-barrier films having an additional plastic film on the inorganic thin film or the protective film mentioned in the above can be used in various applications. The thickness of the plastic film may be selected in accordance with the use thereof, from a range of generally from 5 to 500 μm, preferably from 10 to 200 μm, from the viewpoint of the mechanical strength, the flexibility and the transparency thereof as the substrate of the laminates. Not specifically defined, the width and the length of the film may be suitably selected in accordance with the use thereof. For example, a heat-sealable resin may be used on the inorganic thin film or the protective layer, and the laminate of the type may be heat-sealable and may be used as various containers. The heat-sealable resin may be any known resin including, for example, polyethylene resin, polypropylene resin, ethylene/vinyl acetate copolymer, ionomer resin, acrylic resin, biodegradable resin, etc.

As other embodiments of the gas-barrier film laminate than those described in the above, there may be mentioned one having a print layer formed on the coating surface of the inorganic thin film or the protective layer, and further having a heat-sealable rein laminated thereon. As the printing ink to form the print layer, usable is a water-base or solvent-base resin-containing printing ink. The resin for use in the printing ink includes acrylic resin, urethane-based resin, polyester-based resin, vinyl chloride-based resin, vinyl acetate copolymer resin and their mixtures. Further, any known additives may be added to the printing ink, such as antistatic agent, light-shielding agent, UV absorbent, plasticizer, lubricant, filler, colorant, stabilizer, release agent, defoaming agent, crosslinking agent, antiblocking agent, antioxidant, etc.

The printing method for providing the print layer is not specifically defined. For example, employable is any known printing method of offset printing, gravure printing, screen printing, etc. For drying the solvent after printing, employable is any known drying method of hot air drying, hot roll drying, IR drying, etc. At least one layer of paper or plastic film may be put between the print layer and the heat-sealable layer. As the plastic film, usable is the same thermoplastic polymer film as that for the substrate film for the gas-barrier film laminate of the present invention. Above all, from the viewpoint of attaining sufficient rigidity and strength of the laminate, preferred is paper, polyester resin, polyamide resin or biodegradable resin.

In the present invention, preferably, after the anchor coat layer or the inorganic thin film of the gas-barrier film layer has been formed and then a protective layer has been formed, or after the gas-barrier film laminate has been formed, it is processed for heat treatment from the viewpoint of the gas-barrier property, stabilizing the quality of the film and the quality of the coating layer and finely dispersing the bubbles. The condition of the heat treatment may vary depending on the type and the thickness of the components constituting the gas-barrier film layer. Not specifically defined, any method capable of maintaining the necessary temperature and time may be employable for the treatment. For example, employable are a method of storing the laminate in an oven or a thermostat chamber set at a necessary temperature; a method of jetting hot air to it; a method of heating it with an IR heater; a method of irradiating it with light from a lamp; a method of contacting it with a hot roll or a hot plate to directly impart heat thereto; and a method of irradiating it with microwaves. If desired, the film may be cut into sheets having a size of easy handlability and then heat-treated, or the roll film may be directly heat-treated. In addition, so far as the method ensures the necessary time and temperature, a heating unit may be built in a part of the film production apparatus such as a coater or a slitter, and the film may be heated with it during its production.

Not specifically defined, the temperature in the heat treatment may be any one lower than the melting point of the substrate and the plastic film used. Preferably, the heating temperature is not lower than 60° C., more preferably not lower than 70° C., at which the necessary processing time for attaining the effect of the heat treatment is easy to set. The uppermost limit of the heat-treatment temperature maybe generally 200° C., preferably 160° C. from the viewpoint of preventing the degradation of the gas-barrier property of the gas-barrier film laminate owing to thermal decomposition of the constitutive components of the laminate. The treatment time depends on the heat-treatment temperature, and is preferably shorter when the treatment temperature is higher. For example, when the heat treatment temperature is 60° C., the treatment time may be from 3 days to 6 months or so; when the temperature is 80° C., the treatment time may be from 3 hours to 10 days or so; when the temperature is 120° C., the treatment time may be from 1 hour to 1 day or so; and when the temperature is 150° C., the treatment time maybe from 3 to 60 minutes or so. However, these are only tentative standards, and may be suitably changed or controlled depending on the type and the thickness of the constitutive components of the gas-barrier film laminate.

The gas-barrier film laminate of the present invention preferably has a water vapor permeability (moisture permeability) at 40° C. and 90% RH of at most 0.02 g/m$^2$/24 hr, more preferably at most 0.01 g/m$^2$/24 hr, even more preferably at most 0.005 g/m$^2$/24 hr, from the viewpoint of securing contents.

Also preferably, the gas-barrier film laminate has a total light transmittance of at least 70%, more preferably at least 75%, even more preferably at least 80%, from the viewpoint of the optical properties thereof.

[Method for Producing Gas-Barrier Film Laminate]

A method for producing the gas-barrier film laminate of the present invention comprises (a) a step of forming, on a substrate, at least one constitutive unit layer comprising an anchor coat layer and an inorganic thin film layer in that order, thereby forming a gas-barrier film layer, and (b) a step of laminating at least two formed gas-barrier film layers via an adhesive layer of an epoxy-based resin. Another method for producing the gas-barrier film laminate of the present invention comprises (a) a step of forming, on a substrate, at least one constitutive unit layer comprising an anchor coat layer and an inorganic thin film layer in that order, thereby forming a gas-barrier film layer, (b) a step of laminating at least two formed gas-barrier film layers via an adhesive layer, and (c) after or simultaneously with the lamination of gas-barrier film layers, a step of heating it or irradiating it with energy rays in a vacuum atmosphere at not more than 1000 Pa.

The gas-barrier film layer, the anchor coat layer and the inorganic thin film layer to constitute it, the gas-barrier film laminate formed by laminating at least two gas-barrier film layers, and the adhesive layer are as described hereinabove. The heating and irradiation with energy rays in a vacuum atmosphere is also as described hereinabove.

EXAMPLES

The present invention is described further concretely with reference to Examples, by which, however, the present invention should not be restricted at all. The properties of the gas-barrier film laminates obtained in Examples were evaluated in the manner mentioned below.

(1) Water Vapor Permeability (moisture permeability):

The water vapor permeability was measured by the following procedure according to the conditions prescribed in JIS Z 0222 "Method for Testing Water Vapor Permeability of Moisture-Proof Packaging Containers" and JIS Z 0208 "Method for Testing Water Vapor Permeability of Moisture-Proof Packaging Materials (Cup Method)". Two gas-barrier film laminates or gas-barrier film layers each having a water vapor-permeable area of 10.0 cm×10.0 cm were formed into a bag sealed along four sides thereof enclosing about 20 g of anhydrous calcium chloride as a moisture absorbent. The thus prepared bag was placed in a thermo-hygrostat chamber maintained at a temperature of 40° C. and a relative humidity of 90%, and a mass (unit: 0.1 mg) of the bag was measured at time intervals of 48 hours or longer until 14 days elapsed at which the increase in mass of the bag was kept substantially constant, and the water vapor permeability of the bag was computed from the following formula. The water vapor permeability values on the day 19 are shown in Table 1.

Water Vapor Permeability (g/m$^2$/24 h)=(m/s)/t wherein m is an increase in mass (g) of the bag occurring during the last two time intervals for the measurement among the testing period;

s is a water vapor-permeable area (m$^2$); and t represents the value expressed by [(time (h) taken during the last two time intervals for the measurement among the testing period)/24 (h)].

(2) Oxygen Permeability of Adhesive Layer:

An adhesive was applied to a biaxially-stretched polypropylene (OPP) film having an oxygen permeability of 30000 ml/m$^2$/24 hr/MPa and a water vapor permeability of 8 g/m$^2$/24 hr and having a thickness of 20 μm, to be a predetermined thickness . Using MOCON's OX-TRAN 2/21, the oxygen permeability at 25° C. and 90% RH of the adhesive-coated OPP film was measured, and the oxygen permeability of the adhesive layer was computed.

(3) The Number of Bubbles Having a Diameter of at Least 0.5 mm, Existing between Gas-Barrier Film Layers:

The diameter of bubbles was measured with a stereomicroscope. The number of bubbles was visually counted and converted into that per 100 cm$^2$ of the sample. The data were averaged with n=3, and based on the thus-computed number of bubbles, the samples were evaluated according to the following 5 ranks.

OO: The number of bubbles was not more than 1/100 cm$^2$.
O: The number of bubbles was not more than 2/100 cm$^2$.
Δ: The number of bubbles was not more than 3/100 cm$^2$.
x: The number of bubbles was from 4 to less than 20/100 cm$^2$.
xx: The number of bubbles was 20/100 cm$^2$ or more.

(4) Interlayer Adhesion Strength:

According to JIS 21707, the film laminate was cut into a narrow rectangular piece having a width of 15 mm, and its one edge was partly peeled. Using a peeling tester (Shimadzu's trade name, EZ-TEST), this was T-peeled at a speed of 300 mm/min to measure the lamination strength (g/15 mm).

(5) Vacuum Sealing:

A dry-laminated substrate was prepared, having a constitution of polyethylene terephthalate resin (hereinafter abbreviated as "PET"—Mitsubishi Chemical's Novapex having a thickness of 12 μm)/unstretched polypropylene film (Toyobo's Pylen Film-CT P1146 having a thickness of 100 μm); and two sheets of 30 cm×30 cm were cut out of it. These were put one upon another with their CPP sides kept facing each other, and the three sides were heat-sealed with an impulse sealer to produce a bag for vacuum packaging. The gas-barrier film laminate was put into the thus-produced bag and sealed up in vacuum at 10 Pa or less for vacuum sealing.

(6) Measurement of Surface Roughness (Rms):

Using a non-contact mode (dynamic force mode) scanning probe microscope (Seiko Instruments' SPI3800), the surface of the gas-barrier film layer was analyzed. Regarding the scanning speed, the number of test points in one test region and the correction for grade, the parameters with which the surface condition could be clearly determined were selected. The surface roughness (Rms) of the surface condition of the film was determined through AERA analysis with a software program of "CROSS SECTION" attached to the scanning probe microscope SPI3800.

(7) Total Light Transmittance:

Using a haze meter (Nippon Denshoku Kogyo's HDH2000), the total light transmittance of the film was determined according to a light transmittance method.

Example 1

PET (Mitsubishi Chemical's Novapex) was melt-extruded into a sheet, which was then stretched in the machine direction at a stretching temperature of 95° C. and in a draw ratio of 3.3, then stretched in the transverse direction at a stretching temperature of 110° C. and in a draw ratio of 3.3, and then heat-fixed at 230° C., thereby producing a biaxially stretched PET film of which the shrinkage at 150° C. in MD (machine direction) was 1.2% and the shrinkage in TD (transverse direction, direction perpendicular to the machine direction) was 0.5%. On one surface of the film, formed was an anchor coat layer having a thickness of 0.1 μm by applying thereto a 1/1 (by mass) mixture of an isocyanate compound (Nippon Polyurethane Industry's Coronate L and a saturated polyester (Toyobo's Vylon 300) and drying it according to a gravure coating method.

Next, using a vacuum vapor deposition apparatus, SiO was vaporized according to a high-frequency heating system in a vacuum of $1 \times 10^{-5}$ Torr, thereby forming an inorganic thin film having a thickness of about 20 nm on the anchor coat layer.

Onto the inorganic thin film of the gas-barrier film layer, applied was an aqueous ionomer resin dispersion (Mitsui Chemical's Chemipearl S300) to which were added silica particles having a mean particle size of 1 μm in an amount of 10% by mass relative to the resin solid, thereby forming a thermosetting adhesive layer having a dry thickness of about 3 μm and a surface roughness (Rms) of 0.20 μm. The gas-barrier film with the adhesive layer formed was cut into pieces of 12 cm×12 cm each. Five those gas-barrier film pieces were put one upon another in such a manner that the adhesive layer could face the PET surface of the substrate; and the outermost adhesive layer was stuck to an unstretched polypropylene film (Toyobo's Pylen Film-CT P1196) having a size of 12 cm×12 cm and a thickness of 60 μm; and according to the above-mentioned method, this was packaged in vacuum. The thus vacuum-packaged gas-barrier film laminate was heated in an oven under atmospheric pressure at 120° C. for 30 minutes whereby the adhesive layer was melted to be adhesive to produce a gas-barrier film laminate. The obtained gas-barrier film laminate was evaluated as above. The results are shown in Table 1.

Example 2

A gas-barrier film laminate was produced in the same manner as in Example 1, for which, however, a polyethylene naphthalate film (hereinafter abbreviated as "PEN"—Teijin's Teonex Q65 having a thickness of 75 μm) was used as the substrate of the gas-barrier film layer. The obtained gas-barrier film laminate was evaluated as above. The results are shown in Table 1.

Example 3

A gas-barrier film laminate was produced in the same manner as in Example 1, for which, however, a polyether imide film (hereinafter abbreviated as "PEI"—Mitsubishi Plastics' Superio UT having a thickness of 10 μm) was used as the substrate of the gas-barrier film layer. The obtained gas-barrier film laminate was evaluated as above. The results are shown in Table 1.

Example 4

A gas-barrier film laminate was produced in the same manner as in Example 1, in which, however, the number of the gas-barrier film layers laminated was 9. The obtained gas-barrier film laminate was evaluated as above. The results are shown in Table 1.

Example 5

A gas-barrier film laminate was produced in the same manner as in Example 1, in which, however, the anchor coat layer of the gas-barrier film layer was a silicon nitride/silicon oxide composite film SiON layer (silicon nitride/silicon oxide=8/2) having a thickness of 10 nm, as formed through deposition according to a plasma CVD method where starting gases of monosilane, oxygen, ammonia and hydrogen were fed with applying a predetermined power thereto in vacuum by degassing, and in which the number of the gas-barrier film layers laminated was 9. The obtained gas-barrier film laminate was evaluated as above. The results are shown in Table 1.

Example 6

A gas-barrier film laminate was produced in the same manner as in Example 1, in which, however, the anchor coat layer of the gas-barrier film layer was formed of chromium having a thickness of 0.1 nm through sputtering in an argon atmosphere at 1 Pa in a DC magnetron sputtering apparatus using chromium as a target. The obtained gas-barrier film laminate was evaluated as above. The results are shown in Table 1.

Example 7

A gas-barrier film laminate was produced in the same manner as in Example 1, in which, however, the anchor coat layer of the gas-barrier film layer was formed of a 4/3/3 (by mass) mixture of urethane-based resin, acrylic resin and oxazoline-based resin mentioned below. The obtained gas-barrier film laminate was evaluated as above. The results are shown in Table 1.

Example 8

A gas-barrier film laminate was produced in the same manner as in Example 1, in which, however, the anchor coat layer of the gas-barrier film layer was formed of a 4/3/3 (by mass) mixture of urethane-based resin, acrylic resin and carbodiimide-based resin mentioned below. The obtained gas-barrier film laminate was evaluated as above. The results are shown in Table 1.

In Examples 7 and 8, the urethane-based resin, the acrylic resin, the oxazoline-based resin and the carbodiimide-based resin used for forming the anchor coat layer are shown below.

<Urethane-Based Resin>

A polyester polyol was prepared, comprising terephthalic acid (669 parts), isophthalic acid (631 parts), 1,4-butanediol (472 parts) and neopentyl glycol (947 parts). Next, adipic acid (321 parts) and dimethylolpropionic acid (268 parts) were added to the prepared polyester polyol, thereby producing a pendant carboxyl group-containing polyester polyol A. Further, hexamethylene diisocyanate (160 parts) was added to the polyester polyol A (1880 parts) to produce a water-base coating material of polyurethane-based resin.

<Acrylic Resin>

A mixture of ethyl acrylate (90 parts by weight), methyl methacrylate (30 parts by weight), methacrylic acid (20 parts by weight) and glycidyl methacrylate (10 parts by weight) was solution-polymerized in ethyl alcohol, and after the polymerization, this was heated with adding water thereto to remove ethyl alcohol. This was conditioned at a pH of 7.5 with aqueous ammonia added thereto, thereby producing a water-base coating material of acrylic resin.

<Oxazoline-Based Resin>

Deionized water (179 parts) and a polymerization initiator 2,2'-azobis(2-amidinopropane) dihydrochloride (1 part) were fed into a flask equipped with a stirrer, a reflux condenser, a nitrogen-introducing duct, a thermometer and a dropping funnel, and heated at 60° C. with gradually introducing nitrogen gas thereinto. A monomer mixture of ethyl acrylate (2 parts), methyl methacrylate (2 parts) and 2-isopropenyl-2-oxazoline (16 parts) that had been previously prepared was dropwise added to it through the dropping funnel, taking 1 hour. Next, this was reacted in a nitrogen current at 60° C. for 10 hours. After the reaction, this was cooled to give a water-base liquid of 2-oxazoline group-containing resin having a solid concentration of 10% by weight.

<Carbodiimide-Based Resin>

Hexamethylene diisocyanate (130 parts) and polyethylene glycol monomethyl ether (mean molecular weight 400) (170 parts) were put into a flask equipped with a stirrer, a reflux condenser, a nitrogen-introducing duct, a thermometer and a dropping funnel, and stirred at 120° C. for 1 hour. Further, 4,4'-dicyclohexylmethane diisocyanate (20 parts) and a carbodiimidation catalyst, 3-methyl-1-phenyl-2-phosphorene-1-oxide (3 parts) were added to it, and further stirred in a nitrogen current at 185° C. for 5 hours. After the reaction, this was left cooled to 60° C., and distilled water was added thereto to give a water-base liquid of carbodiimide-based crosslinking agent having a solid concentration of 40% by weight.

Example 9

A gas-barrier film laminate was produced in the same manner as in Example 1, for which, however, the anchor coat layer as in Example 1 was formed on the surface of the inorganic thin film of the gas-barrier film layer formed in Example 1, and then the inorganic thin film layer as in Example 1 was formed thereon. The obtained gas-barrier film laminate was evaluated as above. The results are shown in Table 1.

Example 10

In the same manner as in Example 1, a gas-barrier film laminate was vacuum-packaged, in which, however, the adhesive layer was formed of a coating liquid prepared by mixing and dissolving as an urethane (meth)acrylate ingredient, urethane acrylate (50 parts by mass), as an epoxy (meth) acrylate ingredient, bisphenol A glycidyl ether-type epoxy acylate (weight-average molecular weight, 2000) (20 parts by mass), as an alicyclic (meth)acrylate ingredient, tricyclodecane diacrylate (30 parts by mass), and as a polymerization initiator, 2-hydroxy-1-{4-[4-(2-hydroxy-2-methyl-propionyl)-benzyl]phe nyl}-2-methyl-propan-1-one (2 parts by mass). The UV-curable adhesive layer had a dry thickness of about 3 μm and a surface roughness (Rms) of 0.20 μm. The vacuum-packaged gas-barrier film laminate was irradiated with UV rays from a metal halide lamp (80 W/cm) (Ushio Electric's UVC-05016S1AGF01) to cure the adhesive layer. The obtained gas-barrier film laminate was evaluated as above. The results are shown in Table 1.

Example 11

A gas-barrier film laminate was produced in the same manner as in Example 10, in which, however, the number of the gas-barrier film layers laminated was 9. The obtained gas-barrier film laminate was evaluated as above. The results are shown in Table 1.

Example 12

A gas-barrier film laminate was produced in the same manner as in Example 10, in which, however, the anchor coat layer of the gas-barrier film layer was a silicon nitride/silicon oxide composite film SiON layer (silicon nitride/silicon oxide=8/2) having a thickness of 10 nm, as formed through deposition according to a plasma CVD method where starting gases of monosilane, oxygen, ammonia and hydrogen were fed with applying a predetermined power thereto in vacuum by degassing, and in which the number of the gas-barrier film layers laminated was 9. The obtained gas-barrier film laminate was evaluated as above. The results are shown in Table 1.

Example 13

A gas-barrier film laminate was vacuum-packaged in the same manner as in Example 1 but excepting the following: As the adhesive layer, used was an adhesive film produced as follows: A composition comprising bisphenol A-type epoxy resin (weight-average molecular weight, 400; epoxy equivalent, 200; Yuka Shell Epoxy's Epikote 828) (30 parts by mass); bisphenol A novolak resin (weight-average molecular weight, 960; phenolic hydroxyl group equivalent, 120; Dai-Nippon Ink Chemical Industry's Phenolite LF2882) (25 parts by mass); as a polymer ingredient miscible with epoxy resin, phenoxy resin (weight-average molecular weight, 50,000; Tohto Kasei's Phenotohto YP-50) (30 parts by mass); as a polymer ingredient immiscible with epoxy resin, epoxy group-containing acrylic rubber (weight-average molecular weight, 1,000,000; epoxy equivalent, 3,100; Teikoku Chemical Industry's HTR-860P-3) (30 parts by mass); as a curing promoter, 1-cyanoethyl-2-phenylimidazole (Shikoku Chemical Industry's 2PZ-CN) (0.5 parts by mass); as a coupling agent, γ-glycidoxypropyltrimethoxysilane (Nippon Unicar's NUCA-187) (0.5 parts by mass); and as an inorganic ion adsorbent, antimony-bismuth-based compound (Toa Gosei Kagaku Kogyo's IXE600) (2 parts by mass) was prepared; methyl ethyl ketone (150 parts by mass) was added to it, and mixed in a bead mill; and methyl ethyl ketone (30 parts by mass) was further added thereto to control the viscosity of the resulting mixture, which was then degassed in vacuum.

The obtained varnish was applied onto a release PET film having a thickness of 50 μm and a surface roughness Rms of 0.10 μm, using a knife coater, and then heated at 110° C. for 15 minutes to remove the solvent and to semi-cure the resin, thereby producing a release PET film-attached adhesive film in which the thickness of the adhesive layer was 10 μm. The release PET film was peeled and removed from the release PET film-attached adhesive film, thereby producing an adhesive film having a thickness of 10 μm and a surface roughness (Rms) of 0.10 μm. Using the thus-obtained adhesive film, a vacuum-packaged gas-barrier film laminate was produced in the same manner as in Example 1, in which, however, the number of the gas-barrier film layers laminated was 9; and the vacuum-packaged gas-barrier film laminate was heated in an oven under atmospheric pressure at 120° C. for 30 minutes whereby the adhesive layer was melted to be adhesive to produce a gas-barrier film laminate. The obtained gas-barrier film laminate was evaluated as above. The results are shown in Table 1.

Example 14

A gas-barrier film laminate was produced in the same manner as in Example 13, in which, however, the adhesive film prepared in Example 13 was embossed with an embossing roll to thereby make both surfaces thereof have a surface roughness (Rms) of 5 μm. The obtained gas-barrier film laminate was evaluated as above. The results are shown in Table 1.

Example 15

An epoxy-based adhesive mentioned below was applied onto the surface of the inorganic thin film of the gas-barrier film layer formed in Example 1, thereby forming a thermosetting adhesive layer thereon having a dry thickness of about 3 μm and a surface roughness (Rms) of 0.25 μm, and this was laminated with other gas-barrier film on the PET surface thereof. Further, the same adhesive was applied in the same manner onto the surface of the inorganic thin film of the thus-obtained gas-barrier film, and the outermost adhesive layer was laminated with an unstretched polypropylene film (Toyobo's Pylen Film-CT P1146) having a thickness of 60 μm to produce a gas-barrier film laminate. The obtained gas-barrier film laminate was evaluated as above. The results are shown in Table 1.
<Epoxy-Based Adhesive>
This is an epoxy-based adhesive produced by preparing a methanol/ethyl acetate (9/1) solution that contains epoxy resin having a glycidylamine moiety derived from metaxylylenediamine (Mitsubishi Gas Chemical's TETRAD-X) (50 parts by weight) and epoxy resin curing agent (a) (146 parts by weight) (solid concentration; 35% by weight), followed by adding acrylic wetting agent (BYK's BYK381) (0.4 parts by weight) and silicone-based defoaming agent (Kusumoto Chemical's Disparlon 1930N) (0.05 parts by weight) thereto.

<Epoxy Resin Curing Agent (a)>
Metaxylylenediamine (1 mol) was fed into a reactor. This was heated up to 60° C. in a nitrogen current, and methyl acrylate (0.93 mol) was dropwise added thereto, taking 1 hour. After the addition, this was stirred at 120° C. for 1 hour, and further heated up to 160° C. with removing the formed methanol through evaporation, taking 3 hours. This was cooled to 100° C., and a predetermined amount of methanol was added thereto to make it have a solid concentration of 70% by weight, thereby producing an epoxy resin curing agent (a).

Example 16

A gas-barrier film laminate was produced in the same manner as in Example 15, in which, however, the gas-barrier film layer used in Example 15 was changed to the gas-barrier film used in Example 2. The obtained gas-barrier film laminate was evaluated as above. The results are shown in Table 1.

Example 17

A gas-barrier film laminate was produced in the same manner as in Example 16, in which, however, an adhesive layer was provided on the surface of the inorganic thin film of the laminated other gas-barrier film layer in the same manner as in Example 16, and the same gas-barrier film layer was further provided thereon to be a 3-layered structure. The obtained gas-barrier film laminate was evaluated as above. The results are shown in Table 1.

Example 18

A gas-barrier film laminate was produced in the same manner as in Example 15, in which, however, silica particles (Snowtec MEK-ST, by Nissan Chemical Industries) having a mean particle size of 0.01 μm were added to the epoxy-based adhesive layer in an amount of 5% by mass relative to the resin solid content therein. The obtained gas-barrier film laminate was evaluated as above. The results are shown in Table 1.

Example 19

A gas-barrier film laminate was produced in the same manner as in Example 15, in which, however, polymer particles (Staphyloid AC3364, by Ganz Chemical) having a mean particle size of 0.1 μm were added to the epoxy-based adhesive in an amount of 10% by mass relative to the resin solid content therein. The obtained gas-barrier film laminate was evaluated as above. The results are shown in Table 1.

Comparative Example 1

A gas-barrier film laminate was produced in the same manner as in Example 1, in which, however, the gas-barrier film layers were laminated under atmospheric pressure, not vacuum-packaged. The obtained gas-barrier film laminate was evaluated as above. The results are shown in Table 1.

Comparative Example 2

A gas-barrier film laminate was produced in the same manner as in Example 10, in which, however, the gas-barrier films were laminated under atmospheric pressure, not vacuum-packaged. The obtained gas-barrier film laminate was evaluated as above. The results are shown in Table 1.

Comparative Example 2

A gas-barrier film laminate was produced in the same manner as in Example 15, in which, however, the adhesive was changed to an urethane-based adhesive (mixture of Toyo Morton's AD900 and CAT-RT85 in a ratio of 10/1.5). The obtained gas-barrier film laminate was evaluated as above. The results are shown in Table 1.

TABLE 1

| | Constitution of Gas-Barrier Film Layer | Moisture Permeability through Gas-Barrier Film Layer [g/m² · 24 hr] | Type of Adhesive Layer/ Curing Method | Surface Roughness of Adhesive Layer [μm] | Oxygen Permeability through Adhesive Layer [ml/m²/ 24 hr/MPa] | Number of Laminated Gas-Barrier Film Layers |
|---|---|---|---|---|---|---|
| Example 1 | PET/AC/SiOx *1 | 0.2 | adhesive coated/thermal curing | 0.20 | >1000 | 5 |
| Example 2 | PEN/AC/SiOx *1 | 0.1 | adhesive coated/thermal curing | 0.20 | >1000 | 5 |
| Example 3 | PEI/AC/SiOx *1 | 0.07 | adhesive coated/thermal curing | 0.20 | >1000 | 5 |
| Example 4 | PET/AC/SiOx *1 | 0.2 | adhesive coated/thermal curing | 0.20 | >1000 | 9 |
| Example 5 | PET/AC/SiOx *2 | 0.05 | adhesive coated/thermal curing | 0.20 | >1000 | 9 |
| Example 6 | PET/AC/SiOx *3 | 0.2 | adhesive coated/thermal curing | 0.20 | >1000 | 9 |
| Example 7 | PET/AC/SiOx *1 | 0.2 | adhesive coated/thermal curing | 0.20 | >1000 | 9 |
| Example 8 | PET/AC/SiOx *1 | 0.1 | adhesive coated/thermal curing | 0.20 | >1000 | 9 |
| Example 9 | PET/AC/SiOx/AC/SiOx *1 | 0.03 | adhesive coated/thermal curing | 0.20 | >1000 | 9 |
| Example 10 | PET/AC/SiOx *1 | 0.2 | adhesive coated/UV curing *4 | 0.10 | 500 | 5 |
| Example 11 | PET/AC/SiOx *1 | 0.2 | adhesive coated/UV curing *4 | 0.10 | 500 | 9 |
| Example 12 | PET/AC/SiOx *2 | 0.05 | adhesive coated/UV curing *4 | 0.10 | 500 | 9 |
| Example 13 | PET/AC/SiOx *1 | 0.2 | adhesive film/thermal curing | 0.20 | 300 | 9 |
| Example 14 | PET/AC/SiOx | 0.2 | adhesive film/thermal curing | 5.00 | 300 | 9 |
| Example 15 | PET/AC/SiOx *1 | 0.2 | adhesive coated/thermal curing | 0.25 | 80 | 2 |
| Example 16 | PEN/AC/SiOx *1 | 0.1 | adhesive coated/thermal curing | 0.25 | 80 | 2 |
| Example 17 | PEN/AC/SiOx *1 | 0.1 | adhesive coated/thermal curing | 0.25 | 80 | 3 |
| Example 18 | PET/AC/SiOx *1 | 0.2 | adhesive coated/thermal curing | 0.27 | 80 | 2 |
| Example 19 | PET/AC/SiOx *1 | 0.2 | adhesive coated/thermal curing | 0.35 | 80 | 2 |
| Comparative Example 1 | PET/AC/SiOx *1 | 0.2 | adhesive coated/thermal curing | 0.20 | >1000 | 5 |
| Comparative Example 2 | PET/AC/SiOx *1 | 0.2 | adhesive coated/UV curing *4 | 0.20 | 500 | 5 |
| Comparative Example 3 | PET/AC/SiOx *1 | 0.2 | adhesive coated/thermal curing | 0.20 | >1000 | 2 |

| | Vacuum Degree in Lamination of Gas-Barrier Film Layers [Pa] | Moisture Permeability through Laminate [g/m² · 24 hr] | Number of Bubbles between Film Layers [/100 cm²] | Adhesion Strength [g/15 mm] | Total Light Transmittance [%] |
|---|---|---|---|---|---|
| Example 1 | 10 | 0.02 | ∘∘ | 560 | 81 |
| Example 2 | 10 | 0.01 | ∘∘ | 370 | 83 |
| Example 3 | 10 | <0.01 | ∘∘ | 520 | 82 |
| Example 4 | 10 | <0.01 | ∘ | 520 | 77 |
| Example 5 | 10 | <0.01 | ∘ | 570 | 75 |
| Example 6 | 10 | <0.01 | ∘ | 560 | 72 |
| Example 7 | 10 | <0.01 | ∘ | 570 | 75 |
| Example 8 | 10 | <0.01 | ∘ | 550 | 75 |
| Example 9 | 10 | <0.01 | ∘ | 540 | 72 |
| Example 10 | 10 | 0.01 | ∘∘ | 510 | 82 |
| Example 11 | 10 | <0.01 | ∘ | 540 | 78 |
| Example 12 | 10 | <0.01 | ∘ | 560 | 75 |
| Example 13 | 10 | <0.01 | ∘ | 550 | 75 |
| Example 14 | 10 | <0.01 | ∘∘ | 520 | 77 |
| Example 15 | 101325 | 0.03 | ∘ | 350 | 85 |
| Example 16 | 101325 | 0.01 | ∘ | 370 | 86 |
| Example 17 | 101325 | <0.01 | ∘ | 370 | 84 |
| Example 18 | 101325 | 0.03 | ∘∘ | 350 | 85 |
| Example 19 | 101325 | 0.04 | ∘∘ | 360 | 85 |
| Comparative Example 1 | 101325 | 0.06 | x | 320 | 67 |
| Comparative Example 2 | 101325 | 0.08 | x | 290 | 63 |
| Comparative Example 3 | 101325 | 0.1 | xx | 540 | 72 |

*1: AC is resin layer.
*2: AC is silicon nitride/oxygen nitride composite film, SiON layer.
*3: AC is Cr layer.
*4: UV curing

[Industrial Applicability]

The gas-barrier film laminate of the present invention is extensively used in packaging applications in which products to be packaged are required to be shielded from various gases such as water vapor and oxygen, for example, for packaging foods, industrial products, medicines or drugs, etc., to prevent deterioration thereof. Apart from for such packing applications, in addition, the gas-barrier film laminate is also usable as a transparent conductive sheet or a vacuum heat-insulating material for use in liquid-crystal display devices, solar cells, electromagnetic shields, touch panels, EL substrates, color filters, etc.

The invention claimed is:

1. A gas-barrier film laminate having at least two gas-barrier film layers laminated via an adhesive layer,
   wherein each of the gas-barrier film layers has a substrate film, and at least one constitutive unit layer comprising an anchor coat layer and an inorganic thin film layer formed on at least one surface of the substrate film in that order, and
   wherein the number of the bubbles having a diameter of at least 0.5 mm and the impurities having a diameter of at least 0.5 mm existing between the gas-barrier film layers is at most 3 in total per 100 cm$^2$.

2. The gas-barrier film laminate as claimed in claim 1 having at least three gas-barrier film layers laminated via an adhesive layer, wherein the number of the bubbles having a diameter of at least 0.5 mm and the impurities having a diameter of at least 0.5 mm existing between the gas-barrier film layers is at most 2 in total per 100 cm$^2$.

3. The gas-barrier film laminate of claim 1, having a moisture permeability at 40° C. and 90% RH of at most 0.02 g/m$^2$/24 hr.

4. The gas-barrier film laminate of claim 1, having a total light transmittance of at least 70%.

5. The gas-barrier film laminate of claim 1, wherein the substrate film is at least one resin selected from polyester-based resin, polycarbonate-based resin, polymethacrylic resin, polyetherimide-based resin, polyether sulfone-based resin and cyclic olefin-based resin.

6. The gas-barrier film laminate of claim 1, wherein the gas-barrier film layer has a moisture permeability at 40° C. and 90% RH of at most 0.2 g/m$^2$/24 hr.

7. The gas-barrier film laminate of claim 1, wherein the anchor coat layer comprises at least one selected from a group consisting of polyester-based resin, urethane-based resin, acrylic resin, isocyanate group-containing resin, oxazoline group-containing resin, carbodimide-based resin, and alcoholic hydroxyl group-containing resin.

8. The gas-barrier film laminate of claim 1, wherein the anchor coat layer comprises at least one selected from a group consisting of chromium, silicon oxide, aluminum oxide, titanium oxide, silicon nitride, aluminum nitride, titanium nitride, and hydrocarbon.

9. The gas-barrier film laminate of claim 1, wherein the inorganic thin film layer comprises at least one selected from silicon oxide, aluminum oxide, silicon nitride, aluminum nitride and diamond like carbon.

10. The gas-barrier film laminate of claim 1, wherein the adhesive layer comprises at least one selected from a group consisting of urethane-based resin, polyester-based resin, epoxy-based resin and acrylic resin.

11. The gas-barrier film laminate as claimed in claim 1, wherein the adhesive layer has an oxygen permeability at 25° C. and 90% RH of at most 1000 ml/m$^2$/24 hr/MPa.

12. The gas-barrier film laminate of claim 1, wherein the adhesive layer contains inorganic particles and/or organic particles having a mean particle size of from 0.005 to 50 μm in an amount of from 0.01 to 30% by mass.

13. The gas-barrier film laminate of claim 1, wherein the adhesive layer has a surface roughness (Rms) of from 0.05 to 40 μm.

14. The gas-barrier film laminate of claim 1, which is heated or irradiated with energy rays in a vacuum atmosphere at 1000 Pa or less.

15. The gas-barrier film laminate as claimed in claim 14, wherein the energy rays are UV rays or electron rays.

* * * * *